United States Patent
Sarkar et al.

(10) Patent No.: US 11,494,345 B2
(45) Date of Patent: Nov. 8, 2022

(54) SYSTEM AND METHOD FOR BLOCKCHAIN BASED DECENTRALIZED STORAGE WITH DYNAMIC DATA OPERATIONS

(71) Applicant: Tata Consultancy Services Limited, Mumbai (IN)

(72) Inventors: Sumanta Sarkar, Hyderabad (IN); Harika Narumanchi, Chennai (IN); Lakshmi Padmaja Maddali, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 296 days.

(21) Appl. No.: 17/037,222

(22) Filed: Sep. 29, 2020

(65) Prior Publication Data

US 2021/0255993 A1   Aug. 19, 2021

(30) Foreign Application Priority Data

Feb. 19, 2020   (IN) .............................. 202021007183

(51) Int. Cl.
*G06F 16/182* (2019.01)
*G06F 16/16* (2019.01)

(52) U.S. Cl.
CPC ............ *G06F 16/182* (2019.01); *G06F 16/16* (2019.01)

(58) Field of Classification Search
None
See application file for complete search history.

(56) References Cited

U.S. PATENT DOCUMENTS 11,030,187 B1 * 6/2021 Boodman ............. G06F 16/235
2019/0349733 A1   11/2019 Nolan et al.
2020/0042635 A1 * 2/2020 Douglass ............. H04L 9/3239

OTHER PUBLICATIONS

Zhu, Blockchain-based Decentralized Storage Scheme, 2019 (Year: 2019).*
Kan et al., MTFS: Merkle-Tree-Based File System, 2019 (Year: 2019).*
Abinaya, G. et al., "Block Chain Based Decentralized Cloud Storage", International Journal of Engineering and Advanced Technology (IJEAT), Apr. 2019, vol. 8 Issue—4, Blue Eyes Intelligence Engineering & Sciences Publication, https://www.ijeat.org/wp-content/uploads/papers/v8i4/D6206048419.pdf.

(Continued)

*Primary Examiner* — Yu Zhao
(74) *Attorney, Agent, or Firm* — Finnegan, Henderson, Farabow, Garrett & Dunner LLP

(57) ABSTRACT

This disclosure relates generally to decentralized storage and more particularly to method and system for blockchain based decentralized storage with dynamic data operations. Conventional decentralized storage are limited in capacity thereof to enable dynamic data operations on the sectors stored at them. In an embodiment, the disclosed method and system enabled dynamic data operations such as modification, insertion, and deletion on the stored sectors by leveraging blockchain to achieve publicly verifiable fully stateless Provable Data Possession. Moreover, the disclosed system enables data integrity in decentralized storage with dynamic operations using scheme based on Merkle hash tree and blockchain to provide a transparent verification framework with high detection probability of malicious hosts.

12 Claims, 6 Drawing Sheets

(56) References Cited

OTHER PUBLICATIONS

Charanya, R. et al., "Design of Secure Ehealth System Through Temporal Shadow using Blockchain", The International Journal on Media Management, 2019, vol. 8, Issue—6, Blue Eyes Intelligence Engineering & Sciences Publication, Link: https://www.ijitee.org/wp-content/uploads/papers/v8i6/F4096048619.pdf.
Ali, Saqib et al., "A Blockchain-based Decentralized Data Storage and Access Framework for PingER", IEEE International Conference on Trust, Security and Privacy in Computing and Communications/ 12th IEEE International Conference on Big Data Science and Engineering, Aug. 2018. IEEE, https://www.osti.gov/pages/servlets/purl/1475405.
Zhu, Yan et al., "Blockchain-based Decentralized Storage Scheme", Journal of Physics, Jun. 2019, IOP Publishing, https://www.researchgate.net/publication/334418265_Blockchain-based_Decentralized_Storage_Scheme/link/5d28a107458515c11c2a9a4d/download.
Ghoshal et al.; "Exploiting Block-Chain Data Structure for Auditorless Auditing on Cloud Data", I. Ray et al. (Eds.): ICISS 2016, LNCS 10063, pp. 359-371, 2016.
Wang et al.; "Blockchain Based Data Integrity Verification for Large-Scale Iot Data", Digital Object Identifier, IEEE Access, vol. 7, pp. 164996-165006, 2019.
Communication about intention to grant a European Patent received from the European Patent Office in EP Application No. 20 198 513.2, dated May 9, 2022.
Extended European Search Report issued by the European Patent Office in counterpart European Patent Application No. 20 198 513.2 dated Jan. 18, 2021.

\* cited by examiner

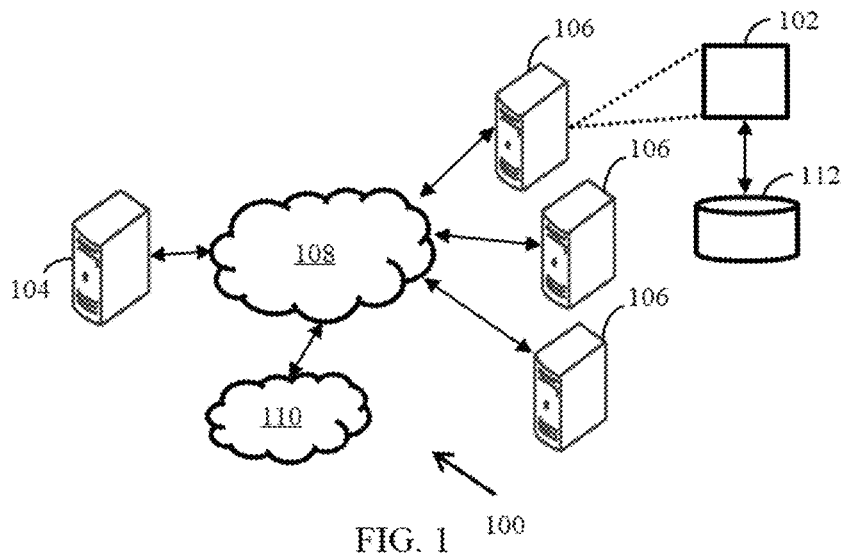

FIG. 1

PROVIDE A DECENTRALIZED STORAGE SYSTEM COMPRISING AT LEAST A CLIENT NODE, A PLURALITY OF HOST NODES COMMUNICATIVELY COUPLED TO THE CLIENT NODE VIA A COMMUNICATION INTERFACE AND A BLOCKCHAIN, WHEREIN THE CLIENT NODE COMPRISES A FILE, FURTHER WHEREIN THE CLIENT NODE SPLITS THE FILE IN A PLURALITY OF BLOCKS AND EACH BLOCK INTO A PLURALITY OF SECTORS, AND DISTRIBUTES EACH OF THE PLURALITY OF SECTORS TO A DISTINCT HOST NODE FROM AMONGST THE PLURALITY OF HOST NODES

FIG. 2A

SYSTEM AND METHOD FOR BLOCKCHAIN BASED DECENTRALIZED STORAGE WITH DYNAMIC DATA OPERATIONS

PRIORITY CLAIM

This U.S. patent application claims priority under 35 U.S.C. § 119 to: India Application No. 202021007183, filed on Feb. 19, 2020. The entire contents of the aforementioned application are incorporated herein by reference.

TECHNICAL FIELD

The disclosure herein generally relates to decentralized storage systems, and, more particularly, to system and method for blockchain based decentralized storage with dynamic data operations.

BACKGROUND

Peer-to-peer storage, also known as decentralized storage has gained significance due to the disadvantages associated with the centralized cloud storage systems. However, since said peer-to-peer storage protocols are in the early stage of development, there is little or no development on a single source of control from central authority. Moreover, existing protocols do not support dynamic operations on stored files which is rather an important feature to enable renters to seamlessly store and modify files.

SUMMARY

Embodiments of the present disclosure present technological improvements as solutions to one or more of the above-mentioned technical problems recognized by the inventors in conventional systems. For example, in one embodiment, a method for blockchain based decentralized storage with dynamic data operations is provided. The method includes providing a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes. Further, the method includes facilitating dynamic data operations on the file stored in the decentralized storage system. Facilitating the dynamic data operations on a sector from amongst the plurality of sectors stored at a host node from amongst the plurality of host nodes includes receiving, at the host node, a request for data operation on a sector stored at the host node, wherein in response to the request, the client node recalls a file tag associated with the tag from the blockchain. Further, the sector and authentication information associated with the sector are sent to the client node, the authentication information includes an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector. Further, a modified intermediate host root is computed by the host node, upon receiving the modified sector and the modified authenticator. The modified intermediate host root is published at the blockchain, wherein remaining hosts of the plurality of hosts recreates a modified top root using the modified intermediate host root, and wherein, based on a determination of the modified top root and the modified intermediate host root, the client node confirms the data operation.

In another aspect, a system for blockchain based decentralized storage with dynamic data operations is provided. The system includes one or more memories; and one or more hardware processors, the one or more memories coupled to the one or more hardware processors, wherein the one or more hardware processors are configured to execute programmed instructions stored in the one or more memories, to provide a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes. Further, the one or more hardware processors are configured by the instructions to facilitate dynamic data operations on the file stored in the decentralized storage system. Facilitating the dynamic data operations on a sector from amongst the plurality of sectors stored at a host node from amongst the plurality of host nodes includes receiving, at the host node, a request for data operation on a sector stored at the host node, wherein in response to the request, the client node recalls a file tag associated with the tag from the blockchain. Further, the sector and authentication information associated with the sector are sent to the client node, the authentication information includes an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector. Further, a modified intermediate host root is computed by the host node, upon receiving the modified sector and the modified authenticator. The modified intermediate host root is published at the blockchain, wherein remaining hosts of the plurality of hosts recreates a modified top root using the modified intermediate host root, and wherein, based on a determination of the modified top root and the modified intermediate host root, the client node confirms the data operation.

In yet another aspect, a non-transitory computer readable medium for a method for blockchain based decentralized storage with dynamic data operations is provided. The method includes providing a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes. Further, the method includes facilitating dynamic data operations on the file stored in the decentralized storage system. Facilitating the dynamic data operations on a sector from amongst the plurality of sectors stored at a host node from amongst the plurality of host nodes includes receiving, at the host node, a request for data operation on a sector stored at the host node, wherein in response to the request, the client node recalls a file tag associated with the tag from the blockchain. Further, the sector and authentication information associated with the sector are sent to the client node, the authentication information includes an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector. Further, a modified intermediate host root is computed by the host node, upon receiving the modified sector and the modified authenticator. The modified intermediate host root is published at the blockchain, wherein remaining hosts of the plurality of hosts recreates a modified top root using the modified intermediate host root, and wherein, based on a determination of the modified top root and the modified intermediate host root, the client node confirms the data operation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a network environment implementing a system for blockchain based decentralized storage with dynamic data operations, according to an embodiment of the present subject matter.

FIGS. 2A and 2B illustrates a flow diagram for a method for blockchain based decentralized storage with dynamic data operations in accordance with an example embodiment.

DETAILED DESCRIPTION

Figure 2B:
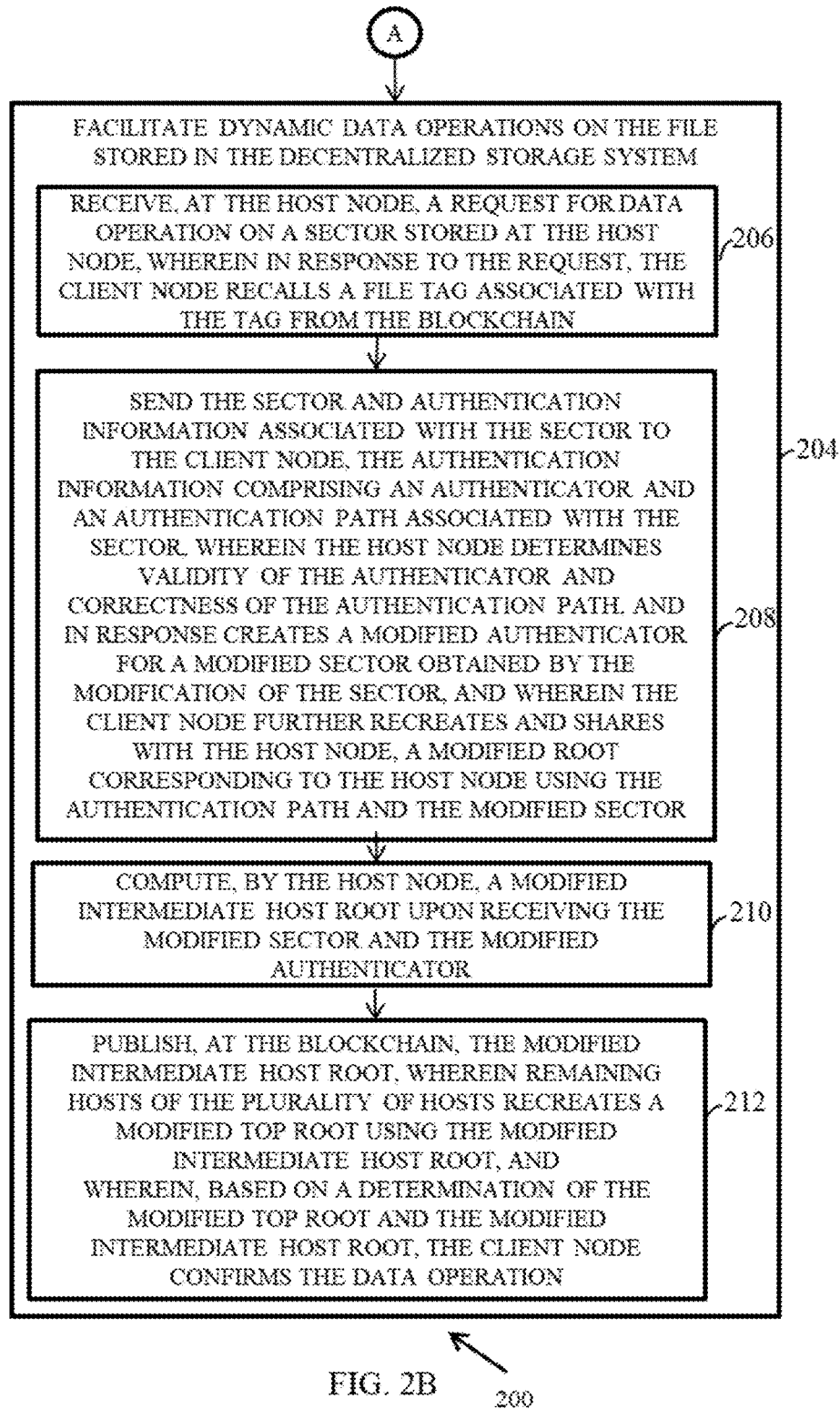

Cloud storage is being utilized by several organizations and end-users due to its high flexibility, availability and accessibility across the globe to store, organize and analyze data. It reduces operational cost and enables easy disaster recovery and end-user mobility. It also minimizes the organization's or end-user's investment on hardware infrastructure. However, there are data privacy concerns as customer's data is controlled by the cloud service provider. Lately there has been growing concern on using cloud storage solutions because of recent reports on data breach incidents that exposed sensitive data of millions of U.S. consumers. Moreover, cloud is controlled by a single organization which is not desirable.

To address these risks of cloud storage, decentralized storage schemes have emerged that make use of host's unused disk space to store data in a decentralized manner to avoid single source of failure and control. This concept is important to mitigate the coordinated attack on the network by suspending all the services provided by the organizations owning large amounts of data on cloud storage or revealing sensitive customers data stored on cloud.

The decentralized storage setup has a set of storage providers (hosts or host nodes) who rent out their unused disk space to the end-users who wish to outsource storage of their files in exchange for monetary benefit. At a high level, each file is split into multiple blocks and stored on different hosts. The end-user's or a Trusted Party Auditor (TPA) periodically checks integrity of the file to ensure that the file is intact. To check file integrity protocols such as proof-of-retrievability (PoR) and Proof of Data Possession (PDP) are used. Previous works on decentralized storage focused mainly on storing static data in different hosts.

In one such conventional system, the hosts (called farmers) the end-users (called data owners) register with a platform to offer their unused disk and to outsource their files respectively in exchange for tokens. The data owner's software renter splits the file into shards and encrypt them and upload these shards to different nodes. The node replicates the pieces until there are at-least six copies of every shard distributed on the network. The data owners can periodically audit the farmers for the integrity of the stored files i.e. they can fully recover the stored files which can be guaranteed using proof of retrievability schemes. Said system uses Merkle trees and Merkle proofs for auditing in the form of challenge response interactions. Moreover, said system uses blockchain only for payments to farmers in the form of Ethereum tokens which are paid by data owners to the platform. Said system, however, does not support smart contracts and penalizing the hosts for a missing proof is taken care of by the platform.

Some of the other known systems or platforms have storage contracts between the hosts and the end-users. Hosts compete to offer their disk space at a low cost than their peers to the end-users. The host should periodically submit proof that the end-user's file is intact on their machine. These proofs are written on to blockchain for public verifiability. The farmers are compensated for submitting the proofs and penalized for a missing proof. One such known platform uses proof of storage, while another platform uses proof of retrievability to ensure the integrity of the file. All these platforms does not have support for dynamic data operations. In yet another conventional platform, the farmers can lend their resources such as storage space, bandwidth, CPU and online time. Safecoins™ are paid as incentives to the farmers for providing their resources. However, none of the existing peer-to-peer storage protocols support modifications on files which is a necessary condition for any file storage schemes.

Various embodiments disclosed herein overcomes the limitations of the known systems and provides a method and system that address the problem of data integrity and dynamic data operations in decentralized storage. For example, in an embodiment, the disclosed method includes distributing a file among multiple hosts to prevent single party control, since if a powerful host can break the encryption, the entire file is not exposed. In the disclosed embodiments, in order to see/access the entire file, all the hosts must collude. Furthermore, the disclosed embodiments facilitate in achieving fully-stateless by storing a verification metadata on a blockchain for public auditability and verifiability.

In various embodiments, the disclosed systems are capable of enhancing existing decentralized storage schemes by making them more practical and enabling renters to dynamically modify the files with high detection probability of sector corruption rather than simply storing their files on host nodes. Moreover, the disclosed system enables data dynamics in decentralized storage and ensures data integrity using co-operative PDP scheme for multi-cloud storage by using blockchain, thereby making the PDP scheme more efficient and trust-worthy. The security of the disclosed system is evaluated in terms of ensuring confidentiality of files, privacy of renters and the hosts, preventing a cheating host and preserving the integrity of files. The disclosed system is platform agnostic and can be implemented on any permissioned and permissionless blockchain platforms, as will be described further in detail with reference to the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 8, where similar reference characters denote corresponding features consistently throughout the figures, there are shown preferred embodiments and these embodiments are described in the context of the following exemplary system and/or method.

FIG. 1 illustrates a network implementation 100 of a system (for example a system 102) for blockchain based decentralized storage with dynamic data operations, in accordance with example embodiments. Herein, the term 'decentralized' refers to the structure of blockchain, wherein the blockchain network is decentralized, meaning thereby that it has no need to rely on any server or node. The data can be recorded, stored, and updated by a group of nodes.

In one embodiment, the network implementation 100 includes at least one client node, for example a client node 104 and a plurality of host nodes, for example a host node 106. In an embodiment, the client node 104 may be associated with a renter that may wish to outsource its files on to multiple hosts who offer their storage space for rent. The file that is to be outsourced is divided into blocks and further divided into sectors and stored on a host. Each host has a block of file. Renter constructs a Merkle Hash Tree from all the sectors and signs the root hash and sends the blocks to hosts. Renters and hosts together maintain blockchain that records root hash of the file, the challenges sent by the verifier, the auxiliary information for each host to their intermediate root and other metadata. All the operations such as registering a renter, registering a host, audit protocol by the renters are run by the smart contracts. For ensuring that the file is intact with the hosts, there is a protocol for integrity verification.

In an embodiment, the basic integrity verification scheme is the use of Merkle tree proofs that also supports dynamic data operations and public verifiability in cloud computing. In an embodiment, said scheme is extended to a multi-host setting in peer-to-peer storage where the file blocks are stored on different hosts rather than a single cloud service provider. Said scheme also provides option for data modification, insertion and deletion to achieve practicality in a decentralized setting. The system implementing the disclosed protocol is described further with reference to FIGS. 2A and 2B and 3.

Herein, it will be understood that the system, for example the system 102 may be embodied in or communicatively coupled to the host node 106. The client node 104 and the host node 106 may be communicably coupled to each other via a communication network 108 and a blockchain network 110. It will be noted herein that the number of devices and/or networks, illustrated in FIG. 1, are provided for explanatory purposes only. In practice or some example scenarios, there may be additional or fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices and/or networks of environment 100 may interconnect via wired connections, wireless connections (laser, infrared, RF, optical), or a combination of wired and wireless connections over the communication network 108.

The communication network 108 may be a wireless network, wired network or a combination thereof. The communication network 108 can be implemented as one of the different types of networks, such as intranet, local area network (LAN), wide area network (WAN), the internet, a metropolitan area network (MAN), an ad hoc network, an intranet, a fiber optic-based network, and/or a combination of these or other types of networks. Additionally or alternatively, the communication network 108 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further the communication network 108 may include a variety of network devices, including routers, bridges, servers, computing devices, storage devices, etc.

The network environment 100 supports various connectivity options such as BLUETOOTH®, USB, ZigBee and other cellular services. The network environment enables connection of devices 106 such as computing devices with the server 104, and accordingly with the database 112 using any communication link including Internet, WAN, MAN, and so on. In an exemplary embodiment, the system 102 is implemented to operate as a stand-alone device.

The client node 104 may include any computation or communication device that is capable of communicating via the communication network 108. For example, the client device may be a computation device that may be capable of storing and distributing a file to host nodes via the communication network to the blockchain 110. In another example, the client node 104 may be implemented in a variety of communication devices such as a laptop computer, a desktop computer, a notebook, a workstation, a mobile phone, a personal digital assistant (PDA), and so on. The client node is configured to register itself on the blockchain to avail services of a decentralized storage. The details of registration of the client node are described further with reference to FIGS. 2A-2B.

The host node 106 may include a computation and communication device that may include extra storage space for lending in order to store the file. The host node may register with the blockchain network to provide the services for file storage. In an embodiment, the host nodes may register to the network by specifying the storage space available with them. In an example embodiment, the host node 106 may be implemented in a variety of communication devices such as a laptop computer, a desktop computer, a notebook, a workstation, a mobile phone, a PDA, and so on. Herein, it will be understood that for facilitating blockchain transactions with reference to the various embodiments of the present disclosure, the host node 106 may be special purpose computing device capable with high computing powers.

In an embodiment, the system, for example the system 102 may be implemented in a computing device, for instance the computing devices 104, 106 such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository or a database, for example, a repository 112. The repository 112 may store data processed, received, and generated by the system 102. In an alternate embodiment, the system 102 may embody the data repository 112.

The computing device embodying system 102 includes specially designed hardware that stores and processes information which allows an individual to make transactions that use, for instance, blockchain. Examples of such transaction may include, for example, sharing of files by the client nodes with the host nodes, data operations on stored files, and so on.

The blockchain 110 may implement a blockchain technology that is composed of multiple technologies, including but not limited to, cryptography, mathematics, consensus algorithms, and economic models, hash function, and so on.

It is a secure, shared and distributed ledger (database) that records all transactional data as what are called blocks. The blockchain use P2P networks and consensus mechanisms to solve the problem of distributed data synchronization, and so it is not necessary to have a centralized trusted authority. The blockchain data structure is defined as an ordered back-linked record of blocks of transactions. Each block can be recognized by a SHA256 cryptographic hash algorithm on the header of the block. Generally, the block is composed of two parts—the main data and the header. The main data contains a list of transactions, while the header includes a hash of the previous and current block, Merkle Root, timestamp, nonce, and other information. FIG. 1 shows the structure of blockchain.

Herein, a hash function can be used for any size of data and corresponds to a fixed-size hash output. It is a one-way function where the returned values are called hash values, hash codes, digests, or simply hashes. Hash functions are often used in computer software for efficiently searching data. Also, the hash function can effectively avoid duplicate data being written into a file or database. Hash functions are also commonly used in an encryption algorithm. The hash function in a cryptosystem, it can quickly generate the hash value of an input and check the correctness corresponding to the data in the cryptosystem. Also, the one-way hash function has no inverse function to convert the hash value back to the original data.

Figure 8:
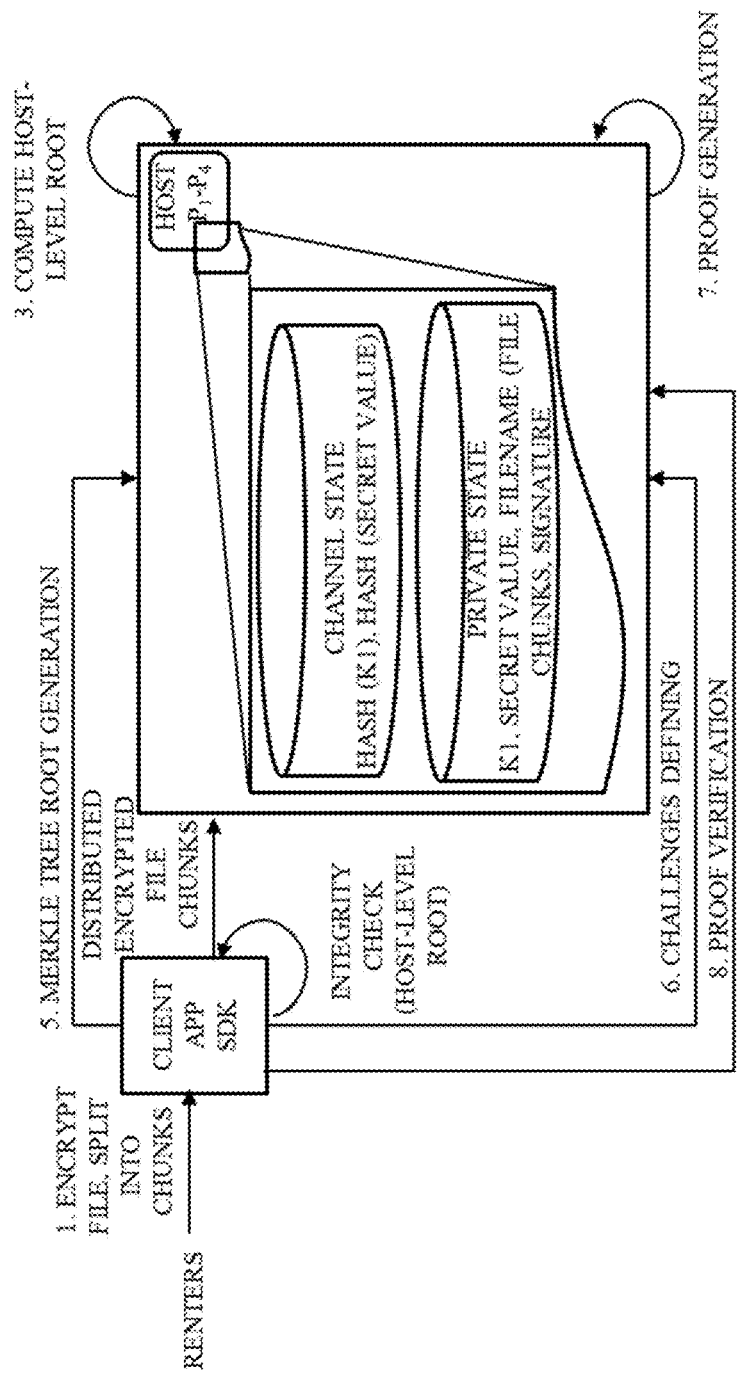
FIG. 8 illustrate an example implementation of process steps for a method for blockchain based decentralized storage with dynamic data operations, in accordance with an example embodiment.

The components and functions of the system 102 are described further in detail in conjunction with method steps of flow diagrams depicted in FIGS. 2A-5C and further with use case examples of FIG. 8. The system 102 can be implemented among the plurality of nodes of the blockchain network, thus enabling sharing and storing of files in a decentralized storage system.

Figure 3:
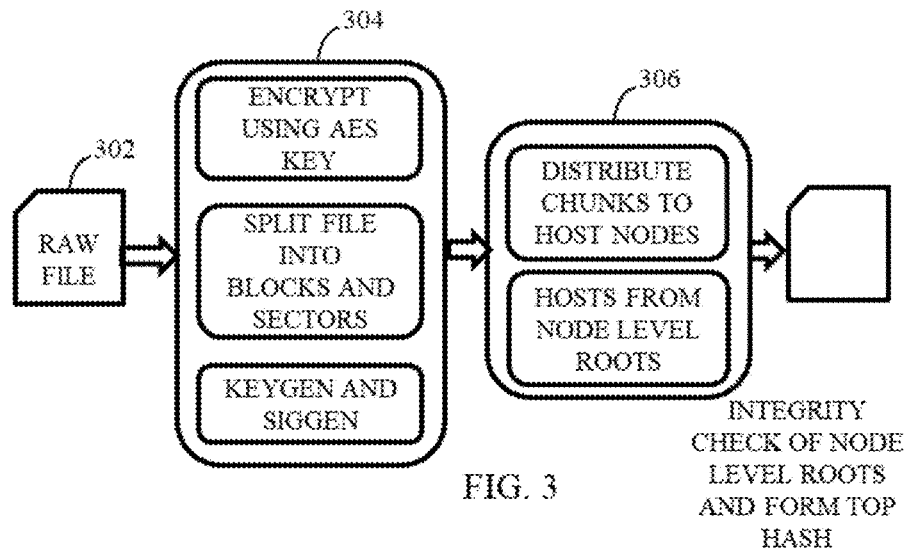
FIG. 3 illustrates an example representation of distribution of a file to multiple host nodes in accordance with an example embodiment of the present disclosure.
Figure 4:
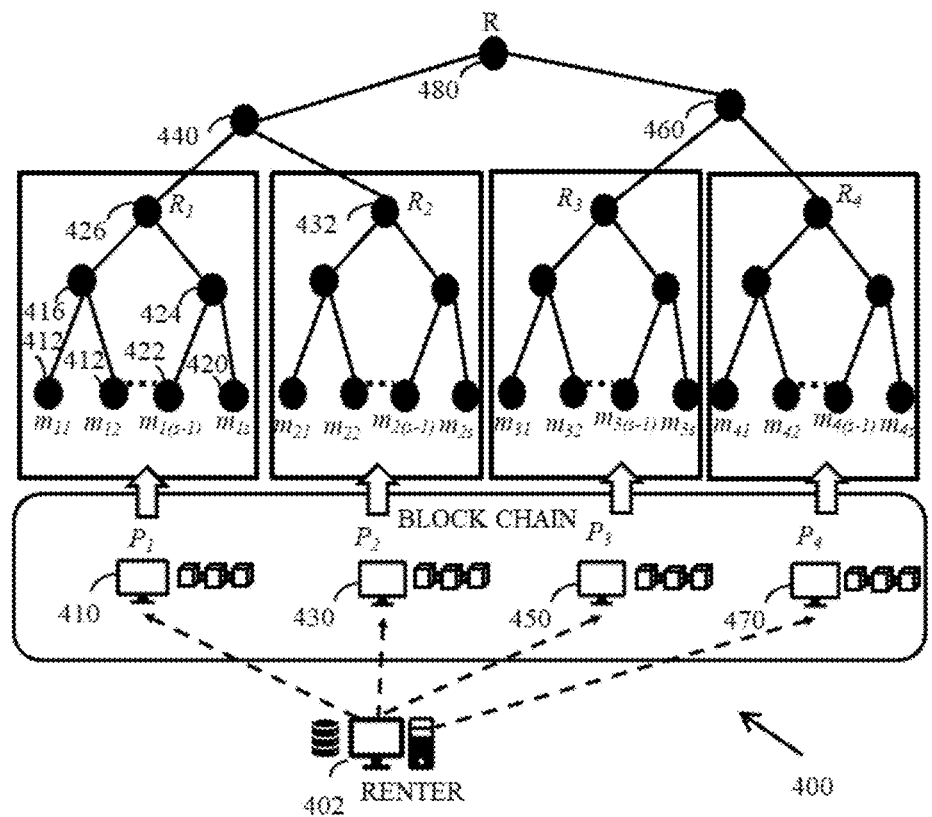
FIG. 4 illustrates an example of the distributed storage system is illustrated in accordance with an example embodiment of the present disclosure.
Figure 5A:
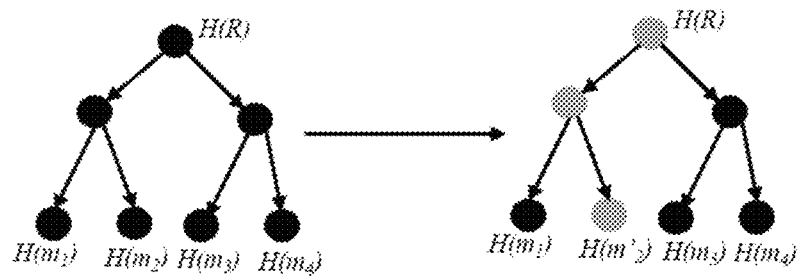
FIGS. 5A-5C illustrate various data operations on sectors of the host node, in accordance with an example embodiment of the present disclosure.
Figure 5B:
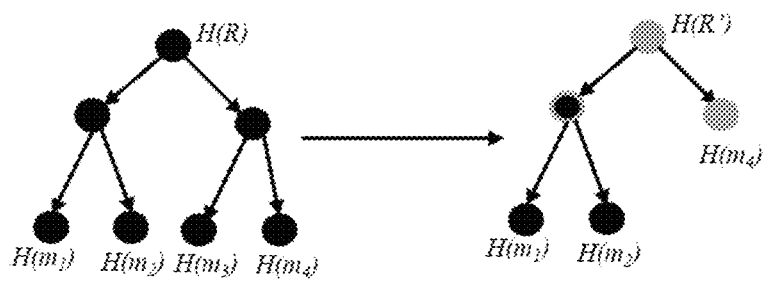
Figure 5C:
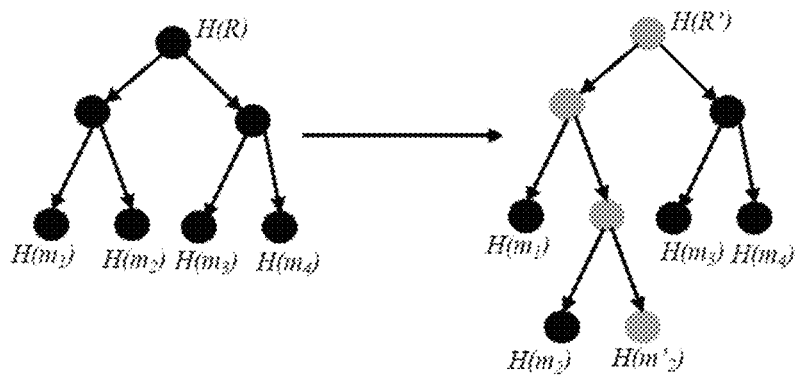

Referring collectively to FIGS. 2A-5C, components and functionalities of the system 102 for blockchain based decentralized storage with dynamic data operations are described in accordance with an example embodiment. For example, FIGS. 2A-2B illustrates a flow diagram for a method for blockchain based decentralized storage with dynamic data operations in accordance with an example embodiment. FIG. 3 illustrates an example representation of distribution of a file to multiple host nodes in accordance with an example embodiment of the present disclosure. FIG. 4 illustrates an example of the distributed storage system 400 is illustrated in accordance with an example embodiment of the present disclosure. FIGS. 5A-5C illustrate various data operations on sectors of the host node, in accordance with an example embodiment of the present disclosure.

FIGS. 2A-2B is a flow diagram illustrating a method 200 for blockchain based decentralized storage with dynamic data operations, using the system of FIG. 1, in accordance with some embodiments of the present disclosure. The steps of the method 200 of the present disclosure will now be explained with reference to the system 100 as depicted in FIG. 1 and the steps of flow diagram as depicted in FIGS. 2A-2B. In an embodiment, the system 102 may be implemented as system 701 of FIG. 7, as will be described further in the description below. The system 701 includes one or more data storage devices or the memory 102 operatively coupled to the processor(s) 104, and is configured to store instructions for execution of steps of the method 200 by the processor(s) 104.

Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At 202, the method 200 includes providing a decentralized storage system, for example system 102 of FIG. 1 comprising at least a client node, a plurality of host nodes communicatively coupled to the client node via a communication interface and a blockchain. In order to perform the file sharing and storage in decentralized storage systems, the client node and the host nodes are registered on the blockchain network. For example, the host node (or the renter) makes use of membership services available in the specific blockchain platform and registers with said network. Host node can have multiple pseudonyms corresponding to public and private key pair thereof. Renter can initiate a request for outsourcing a file using a pseudonym and distribute the file to multiple hosts. The renter may specify the duration for which it wants to store data on the hosts and hosts may specify the amount that may be charged for providing the storage services. This agreement may be stored on blockchain for reference.

Similarly, the host nodes may be registered on the blockchain network. For instance, any host node that wants to lend extra storage space may register with the blockchain network to provide the services. Hosts nodes may register to the blockchain network by specifying the storage space available with them. Herein, it will be understood that in the present embodiment, the system may not use proof of space for proving the storage space available with the client node, as the host node that does not have enough space may not be able to store the files. Said host note may be identified on subsequent audits and may be penalized. Herein, the terms 'host' and 'peer' may be used interchangeably. Similar to client node, the host nodes may also initiate transactions using pseudonyms to hide their identity.

Herein, for the brevity of description, a scenario for the registration of the client nodes and the host nodes on the blockchain network is described. However, it will be understood that the registration of the client nodes and the host nodes on the blockchain network may be performed in any known manner based on the prerequisites and conditions put forth for such registration, and are not limited to the scenarios described herein.

In the present embodiment, the blockchain is leveraged to store metadata of the file. Each file may have a public and private information. Public information may be visible to all the host nodes whereas the private information may be host specific. Examples of private information may include, but are not limited to, the encrypted sectors of a file, their hashes, authenticators and the authentication paths. The private information may be stored in the private state. Examples of public information may include, but are not limited to, the challenges, host level roots, the top root and the proofs information. Said public information may be stored as a part of the public state. An important contribution of disclosed embodiments is storing of said public and private information on the blockchain network. The technical advantage of recording the public and private information on blockchain network is that it enables the client node to retrieve required data in a transparent and verifiable manner as and when required, rather than storing metadata of the file at their end, eventually making the protocol fully stateless. Stateless verification enables the renter to verify the possession of the file without storing any verification data.

In an example embodiment, the client node may be setup for file storage in the distributed storage system 100. During a setup phase of the host node, let e:G×G→$G_T$ be a bilinear map, where g is a generator of G. Suppose H:{0,1}*→G is a BLS hash function. The client node possesses (ssk,spk) which are private and public key pair for the system. As illustrated in FIG. 3, the client node may have a raw data file F (marked as 302) which may be encrypted using a symmetric encryption, for example, Advanced Encryption Standard (AES) 304. The client node distributes blocks of file to multiple host nodes. Each of the host node may divide the encrypted file $\hat{F}$ into n blocks {$m_1 \ldots m_n$} at 306. The host node may select name from $Z_p$ as an identifier of the file, u and α are chosen uniformly at random from G and $Z_p$ respectively. The host node creates private and public parameters (ssk,spk)=(α, v=$g^α$).

The host node may split each block into s sectors where each sector is an element of $Z_p$. A file tag $t_0$=name||u||n||s is created which can be used in proof verification. Each sector in a file is $m_{ij}$ where i∈[1,n] and j∈[1,s]. For each $m_{ij}$ the host node may create the authenticator as follows.

$$\sigma_{ij}=(H(m_{ij})\cdot u^{m_{ij}})^α$$

Then the $i^{th}$ host receives {$m_{ij},\sigma_{ij}$}$_{1\le j\le s}$ and $t_0$ is broadcasted to the blockchain.

Before distributing the blocks of the file to the plurality of host nodes, the host node forms a global Merkle tree for the purpose of validating the file. The structure of the global Merkle tree helps in verifying consistency of data. A Merkle tree is a complete binary tree, and is formed by hashing a pair of leaf nodes until a single hash remains called the Merkle root. For a block, the Merkle root comes from a hashing transaction and pairing two transactions to hash and generate the upper level tree node. By doing so, it gets one hash to store that is deterministic based on the hashes of all the underlying transactions. This single hash is called the Merkle root. In the blockchain, each block has a Merkle root stored in the block header. The Merkle root acts as a validator for the entire tree. An example Merkle tree is illustrated in FIG. 4. Herein, it will be understood that the term intermediate root refers to an intermediate node of the Merkle tree, hence throughout the description, the terms intermediate root and intermediate node will be used interchangeably.

Referring now to FIG. 4, an example of the distributed storage system 400 is illustrated in accordance with an example embodiment of the present disclosure. As shown, the distributed storage system 400 includes a renter or a client node 402 and a plurality of host nodes 410, 430, 450, 470. In the present embodiment, the client node 402 distributes the ns sectors among n hosts (for example host nodes 410, 430, 450, 470) with each host node having s sectors. Sectors in each host node concatenated with their corresponding indices are grouped in pairs to form an intermediate root for that host node. For example, for host node 410, the sectors 412, 414 may be concatenated with their corresponding indices in pairs to form a parent node 416. Similarly, the sectors 420, 422 may be concatenated with their corresponding indices in pairs to form a parent node 424, and the parent nodes 416, 424 are concatenated to form the intermediate root 426. Also, an intermediate node 432 from the host node 430 and intermediate node 426 from the host node 410 are hashed together to form its parent root 440. The parent root 440 from the host nodes 410, 430 and parent root 460 from the host nodes 450, 470 are hashed together to form a Merkle root R 480. The Merkle root R can validate the entire file. The authentication path for $m_{ij}$ is represented by a set of intermediate sibling hashes {$\Omega_{ij}$} required to compute the top root. Merkle tree preserves the order in which the sectors are stored.

After splitting the file, the sectors of the file are then distributed by the client node to a plurality of host nodes. For example, the client node sends {{$m_{ij}$},{$\sigma_{ij}$}} for j∈[1,s] to host $P_i$ where i∈[1,n]. The steps in distributing file to multiple hosts is described further in detail with reference to FIG. 3.

Referring back to FIG. 3, n blocks of file F are distributed to n storage providers $P_1 \ldots P_n$ and intermediate root $R_i$ corresponding to each host $P_i$ are calculated by each host node. The client node verifies each of the intermediate roots and after verification all the host nodes form the top root hash R. The host level roots $R_i$ and the top root R may be available to all of the plurality of host nodes on the blockchain whereas the sectors corresponding to each host are accessible only to the corresponding host.

In an embodiment, the blockchain network enables a challenge response protocol between host nodes and a verifier node. Herein, the verifier node may be one of a renter or an auditor that can be one of the host nodes (from amongst the plurality of host nodes) for the entity planning to verify the file integrity. Integrity of blocks should be verified in every host. Therefore, challenges are sent to every host node and host nodes should collaborate for generating the proof of file possession.

For each i, $1 \leq i \leq n$, verifier picks c random locations from $[1,s]$ and form the subset $J_i$. Then form the c-subset of $Z_p$ challenge values $\{v_{ij}\}_{j \in J_i}$.

Verifier node broadcasts chal=$\{i, \{v_{ij}\}_{j \in J_i}\}$, $1 \leq i \leq n$ to the blockchain. The integrity verification includes a proof generation protocol and proof verification protocol.

Hosts $P_i$ where $i \in [1,n]$ read the challenges from the blockchain network. Each host acts as a prover, host i computes:

$$\mu_i = \sum_{j \in J_i} v_{ij} m_{ij}$$

$$\sigma_i = \prod_{j \in J_i} \sigma_{ij}^{v_{ij}}$$

The blockchain creates the collective proof $$\mu = \Sigma_{i=1}^{n} \mu_i$$

$$\sigma = \Pi_{i=1}^{n} \sigma_i$$

The host node records proof $\{\mu, \sigma, \{H(m_{ij}), \Omega_{ij}\}\}$ on blockchain.

For proof verification, the verifier node receives the proof information $\{\mu, \sigma, \{H(m_{ij}), \Omega_{ij}\}\}$. The verifier node checks the validity of the stored file as follows:

$$e(\sigma, g) \stackrel{?}{=} e(\Pi_{i=1}^{n} \Pi_{j \in J_i} H(m_{ij})^{v_{ij}} u^{\mu}, v)$$

The verifier node uses authentication information $\{H(m_{ij}), \Omega_{ij}\}$ for the challenges to check the correctness of the challenged position and check intermediate roots $R_i$ of each host $P_i$. If any of the intermediate roots $R_i$ does not match, then the corresponding host $P_i$ is corrupted. The stored file is intact only if the above two steps are successful.

In an embodiment, once the client node and the host nodes are registered on the blockchain network, the disclosed system can facilitate dynamic data operations in the decentralized storage system at 204. Examples of dynamic data operations may include, but are not limited to, performing one or more of modification operation, insertion operation, and deletion operation on the sector information stored at the host node. As the authentication does not require indices, one can perform insertion, deletion and modification operations.

Facilitating the dynamic data operations on the file sectors stored at the one or more host nodes is described further in detail below with reference to steps 206-212 of FIGS. 2A-2B. Referring back to FIGS. 2A-2B, at 206, the host node receives a request for data operation on a sector stored. In response to the request, the client node recalls a file tag associated with the tag from the blockchain. In response to the request, the client node recalls a file tag associated with the tag from the blockchain.

At 208, the host sends the sector and authentication information associated with the sector to the client node. The authentication information includes an authenticator and an authentication path associated with the sector. The host node determines validity of the authenticator and correctness of the authentication path, and in response creates a modified authenticator for a modified sector obtained by the modification of the sector. The client node further recreates and shares with the host node, a modified root corresponding to the host node using the authentication path and the modified sector.

At 210, the host node creates a modified intermediate host root upon receiving the modified sector and the modified authenticator. At 212, the host node publishes, at the blockchain, the modified intermediate host root. Herein, remaining hosts of the plurality of hosts recreates a modified top root using the modified intermediate host root. Based on a determination of the modified top root and the modified intermediate host root, the client node confirms the data operation.

In an embodiment, the data operation may be a modification operation to be performed on the sector stored at the host node. The method for performing modification operation on the host node is described hereinunder with reference to FIG. 5A.

For instance, the Renter (or the client node) wants to modify the $j^{th}$ sector of $i^{th}$ host, $m_{ij}$ to m'. The renter may recall $t_0$=name$\|u\|n\|$s from the blockchain as done during the integrity checking. The Host node i sends $m_{ij}$ along with $\sigma_{ij}$ and its authentication path $\Omega_{ij}$. The Renter may then check the validity of $\sigma_{ij}$ $$e(\sigma_{ij}, g) \stackrel{?}{=} e(H(m_{ij}) \cdot u^{m_{ij}}, v)$$

The Renter checks the correctness of the authentication path. The Renter then creates modified authenticator for the modified sector m'

$$\sigma' = (H(m') \cdot u^{m'})^{\alpha}$$

The Renter recreates the modified root of Host $P_i$ as $R'_i$ using the authentication path $\Omega_{ij}$ and m'. Upon receiving m' and $\sigma'$, the host node i calculates $R'_i$, and publishes it to the blockchain. All the hosts recreate the top root R' with the modified $R'_i$. The Renter confirms if R' and $R'_i$ are correct.

In another embodiment, the request for data operation may include performing an insertion operation on the sector stored at the host node. The insertion operation may include inserting the new sector after a specific position of the host. The method for performing insertion operation on the host node is described hereinunder with reference to FIG. 5B.

For instance, the Renter wants to insert m' after the $j^{th}$ position of the $i^{th}$ host. The Renter recalls $t_0$=name$\|u\|n\|$s from the blockchain as done during the integrity checking. The Host node $P_i$ sends $m_{ij}$ along with $\sigma_{ij}$ and its authentication path $\Omega_{ij}$. The Renter checks the validity of $\sigma_{ij}$ $$e(\sigma_{ij}, g) \stackrel{?}{=} e(H(m_{ij}) \cdot u^{m_{ij}}, v)$$

The Renter checks the correctness of the authentication path. The Renter creates modified authenticator for the new sector m'

$$\sigma' = (H(m') \cdot u^{m'})^{\alpha}$$

The Renter sends the insert request to the host along with the new sector m', the position j after which the sector has to be inserted, and the modified authenticator $\sigma'$. The Host creates parent node from $H(m_{ij})$ and $H(m')$. Said parent node takes the place of $H(m_{ij})$ and a new root $R'_i$ is created using m' and authentication path $\Omega_{ij}$ and sends $R'_i$ as response to the renter. The Renter checks if the correctness of insertion operation by generating new root $R'_i$ using authentication path $\Omega_{ij}$, $m_{ij}$ and m' and validates against host's response. After confirmation from the renter the host publishes new root $R'_i$ to the blockchain. All the hosts recreate the top root R' with the modified $R'_i$. The Renter confirms if $R'_i$ and R' are correct.

In yet another embodiment, the request for data operation may include performing a data deletion operation on the sector stored at the host node. The method for performing data deletion operation on the host node is described hereinunder with reference to FIG. 5C.

In data deletion operation, for instance, the Renter may wish to delete $j^{th}$ sector of $i^{th}$ host and sends a delete request. The Host deletes $m_{ij}$ from its storage, replaces the parent hash of $m_{ij}$ with the sibling hash and generates a new root $R'_i$. The Host node sends the proof of deletion by sending the parent hash, its authentication path and new root $R'_i$ to the renter. The Renter checks the correctness of deletion operation by computing new root $R'_i$ and validating against host's response. After confirmation from the renter the host publishes new root $R'_i$ to the blockchain. All the hosts recreate the top root R'. with the modified $R'_i$. The Renter confirms if R' and $R'_i$ are correct.

In an example scenario, the payment to the host node can be initiated by the renters using smart contacts after successful verification of the proof of data possession. In certain scenario, if a host is down due to some genuine reason and if the part of file stored on that host cannot be retrieved, erasure code can be used to get the whole file even with some missing parts i.e. k out of n parts are sufficient to recover the original file.

The system is designed with intermediate roots to facilitate easy detection of the corrupt hosts in the case of root mismatch and also act as the authenticators for the file parts stored on that particular host. Authentication paths improve the efficiency while computing the intermediate roots in case of root mismatch by considering only the path from leaf to root without using all the leaves.

Confidentiality of outsourced files is important to avoid disclosure of renter's information to the third parties. The disclosed system handles confidentiality at two levels: firstly the files stored on the hosts are encrypted with the renter's secret key and secondly the complete file is not available with a single entity. Therefore, for an adversary to retrieve the file, all the hosts storing the file must collude and the adversary should have access to the secret key of the renter. This prevents unauthorized access to the file. Blockchain ensures in preserving integrity of the file as it records the host level roots, top root and challenge response values to provide a transparency and tamper proof record of the proof of data possession.

As the file is divided into n-blocks and each block has s sectors, the total number of sectors in whole file is n×s. Size of each sector is λ-bit. Let the probability of file corruption by the $i^{th}$ host be i. Let c be the number of challenged sectors per host, the number of challenges for the whole file with n hosts is nc. The success probability that a host is cheating is $(1-\epsilon_i)^c$. Therefore, the probability that file corruption is detected by the renter is $$1 - \prod_{i=1}^{n}(1-\epsilon_i)^c$$

It may be assumed that each node has the same file corruption probability, that is $\epsilon_i = \epsilon$. Then the detection probability is $$1 - \prod_{i=1}^{n}(1-\epsilon)^{nc}$$

Figure 6:
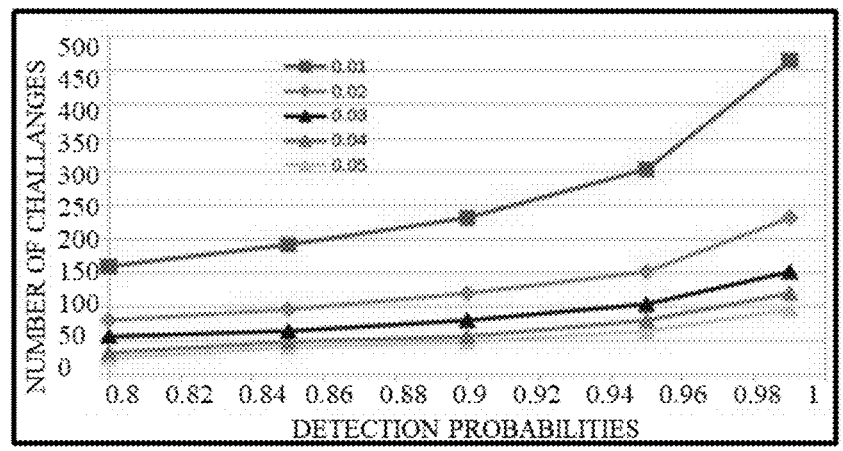
FIG. 6 illustrates variation of detection probabilities with number of challenges in accordance with an example embodiment.

Based on this, a graph illustrated in FIG. 6 is presented which compares the number of challenged sectors for different detection probabilities.

Example Scenario:

An example scenario is considered where file size is 1 GB that is to be distributed to 8 hosts. Each host gets 125 MB of file. The number of sectors s in each host with each chunk size 256-bits is 4096000. The total number of sectors n for the given file is 32768000. Suppose the failure probability of the host that is detected by the renter be 90% and the sector corruption probability be 0.0001. Around 1% of the sectors are needed to be sent as challenge to achieve 90% detection of file corruption. The graph depicting various detection probabilities and corruption probabilities is illustrated in FIG. 6. The number of challenges per host is independent of the number of sectors stored per host. The disclosed system ensures that host cannot cheat a renter by persisting the hashes of the file blocks and not storing the files. The protocol ensures that while generating proof the host uses actual sector in calculating μ. Therefore, even if the host persists the file hash, it needs $m_{ij}$ to calculate $v_{ij}m_{ij}$ which ensures that the host actually stores the file. For verification, the renter does not need to store any metadata or file, rather it retrieves the verification information from the blockchain and performs the verification. Therefore, the disclosed protocol embodied in the disclosed system is fully stateless.

Renters and hosts information are submitted as a transaction to the blockchain network and this information is recorded on to a common ledger after validation, which is available to all the entities participating in the network. Therefore, there can be privacy concerns for both renters and hosts about the information stored on the ledger. To enable privacy, renters and hosts can choose to be anonymous by registering themselves with pseudonyms on the network. Blockchain enables them to be anonymous while submitting transactions to the network. Pseudonyms also allows users to make their transactions unlinkable. Unlinkability of transactions does not reveal the actual identity of the renters and cannot link the transactions initiated by the same renter or host. The renters and hosts can be mutually anonymous.

In the present example scenario the system is implemented as a proof of concept of this protocol on Hyperledger Fabric platform Version 1.4.4. This protocol can be implemented on any permissioned or permissionless blockchain platform. Hyperledger Fabric was selected to leverage its unique private data collections feature which is necessary for the protocol embodied by the system. The robustness and scalability of said protocol was tested by taking various file sizes. The test setup uses a system configuration of 2.9 GHz Intel QuadCore Processor with 4 GB RAM running a Fedora 28 operating system to run the simulations.

Figure 7:
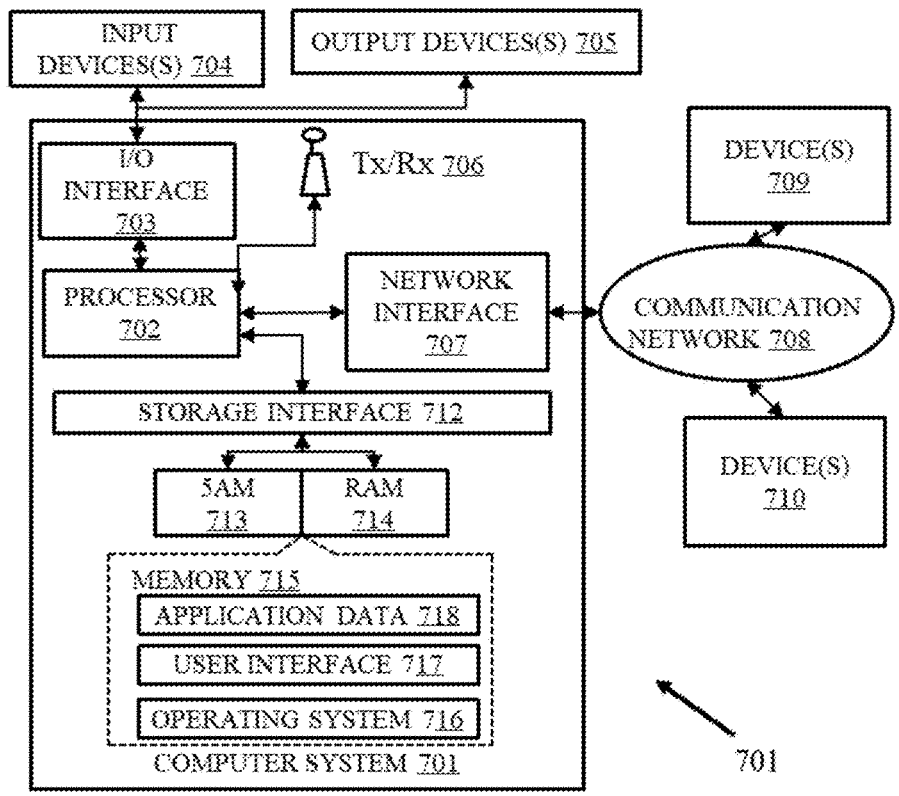
FIG. 7 illustrate a block diagram of an exemplary computer system for implementing embodiments consistent with the present disclosure.

The flow of the protocol is described in the implementation perspective with respect to Hyperledger Fabric (HLF) with reference to FIG. 7. A network with single channel (private blockchain network) consisting of one orderer node, 8 organizations, 8 peers (one for each organization), 8 certificate authorities (CA) (one for each organization) is considered for implementation. Organizations also called as the members were invited to join the blockchain network by the blockchain service provider. Each peer uses CouchDB™ to maintain the ledger state. To keep file sectors private from other hosts, the protocol leveraged private data collections feature in HLF. This feature allows hosts to see a transaction while keeping a portion of the data private. Each host in the channel installs the smart contract to simulate transactions.

Nine private data collections were defined, one for each organization and a common collection to all organizations. The policy in the collection allows only members of that organization to store and access the private data in their private state. The policy defined in the common collection allows all members of the channel (Org1, Org2 . . . Org8) to have the private data in a private state. Access to the private data will be restricted as follows:

FileName, HostName, HostRoot ($R_i$), Signature of Host Root, Renter Approval Status, MerkleRoot (R), Signature of MerkleRoot, Challenges, HostLevelProofs ($\mu_i$, $\sigma_i$), AggregatedProof ($\mu,\alpha$) and AuditVerificationStatus are visible to all members of the channel (Org1, Org2 . . . Org8).

Encrypted file sectors, their hashes, authenticators and authentication path are visible only to members of the given organization. Each organization has a policy defined such that it allows members of that organization to access their private data.

The Renter's application interacts with the ledger through smart contract. At renter side, raw file F is encrypted using AES in CBC mode to get an encrypted file. This encrypted file is split into sectors $m_{ij}$ of $\lambda$-bits each. Splitting an encrypted file is achieved using OpenSSL split command. After splitting the file into sectors, the client application submits a transaction proposal. The transaction proposal consists of encrypted file sectors and their authenticators $\sigma_{ij}$ as private inputs which are sent to a host.

Host validates the proposal and update file public and private information ($m_{ij},\sigma_{ij},H(m_{ij})$) into the system. As per the defined collection access policy, private data will be stored in organization specific private state.

Host level root guarantees integrity of the file sectors stored in that specific host $P_i$. After the file distribution, peers compute host level roots $R_i$ from sectors by forming a Merkle tree with SHA256 hash. These are computed at peer level independently. Each host updates its root and is available to all hosts in the channel. Subsequently, the client computes node level root hashes and sends its approval status as host-level-root verification success or host-level-root verification fail and the verification status is updated in the public state, visible to all organizations in the channel.

Merkle root R guarantees integrity of the whole file. If the integrity of top root fails, one can verify the host level roots in order to detect a corrupt host. The renter submits Merkle root computation transaction proposal. The transaction is validated by the smart contract to determine the possibility of creating Merkle root. The generation depends on the renter's approval status. The smart contract queries the renters approval status on any one peers for a given file. If the approval status of all hosts is host-level-root verification success, then one of the hosts compute the Merkle root and update the result to the blockchain.

Renter can verify the integrity of stored file at any point of time by challenging the hosts to send proof of data possession. To challenge the hosts, renter defines challenges $\{i,v_{ij}\}$ and submits a transaction. Hosts validate the transaction and updates the challenges, authentication paths ($m_{ij},\Omega_{ij}$) to the network, available to all the hosts.

After receiving the challenges, peers submit proof generation transaction proposal. Each peers simulates the transaction and generates a proof of data possession ($\mu_i,\sigma_i$) for the challenged sectors and updates to the network. These host level proofs are available to all the hosts. After receiving the proofs from the individual hosts ($\mu_1 \ldots \mu_8, \sigma_1 \ldots \sigma_8$), one of the host aggregates the proofs to compute the aggregated proof $\mu$, $\sigma$.

Renter or verifier submits proof verification transaction proposal. One of the peer simulates the transaction to verify the integrity of the stored file. Peer sends the verification information $\mu,\sigma,m_{ij},\Omega_{ij}$ of the challenged sectors and the metadata information u, s, n. Verifier runs the verification protocol to check the integrity of the stored file. Renter or verifier updates the verification status as PDP verification success if all the steps in the verification succeed. If any of the steps fail, corrupted host is determined using Merkle tree and updates the status as PDP verification fail for that particular host in the public state. The system fails to verify if the host sends proof for the non-challenged sectors or corrupted sectors.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for blockchain based decentralized storage with dynamic data operations. The decentralized storage is important to avoid single point of trust in outsourcing file to a service provider. When a file is distributed among different hosts, dynamic file support is necessary to enable renters to modify files which is a common operation on outsourced files. Conventional methods and system in decentralized storage do not offer dynamic file support. Renter verifies the integrity of outsourced file through proof of data possession. To enable transparency in the verification process the disclosed system and method leverages blockchain to store the Merkle roots, challenges and proofs in a public state which can be retrieved as and when required.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
providing, via one or more hardware processors, a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes;
facilitating, via the one or more hardware processors, dynamic data operations on the file stored in the decentralized storage system, wherein facilitating the dynamic data operations on a sector from amongst the plurality of sectors stored at a host node from amongst the plurality of host nodes comprises:
receiving, at the host node, a request for data operation on a sector stored at the host node;
sending, by the host node, the sector and authentication information associated with the sector to the client node, the authentication information comprising an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector;
computing, by the host node, a modified intermediate host root upon receiving the modified sector and the modified authenticator; and
publishing, by the host node, at the blockchain, the modified intermediate host root, wherein remaining hosts of the plurality of hosts recreates a modified top root using the modified intermediate host root, and wherein, based on a determination of the modified top root and the modified intermediate host root, the client node confirms the data operation;
wherein the client node forms a local Merkle tree using modified sector and authentication path associated with the sector before modification, wherein the authentication path for each sector is represented by a set of intermediate sibling hashes required to compute a top root of the local Merkle tree, further wherein the local Merkle tree preserves the order in which the sectors are stored, and further wherein the local Merkle tree of modified sector corresponding to the host node and remaining intermediate roots of each of the plurality of host nodes form a global Merkle tree capable of validating a current status of the file, wherein a root of each of the plurality of host nodes are taken as leaf nodes to form the global Merkle tree.

2. The method of claim 1, wherein the request for data operation comprises performing a modification operation on the sector stored at the host node, and
performing an insertion operation on the sector stored at the host node, the insertion operation comprising inserting the new sector after a specific position of the host.

3. The method of claim 1, wherein the client node further sends an insert request to the host node along with the new sector, the position after which the sector is to be inserted, and the new authenticator.

4. The method of claim 1, further comprising creating by the host node, a new parent node from a hash of the sector at the position after which the sector is to be inserted and hash of the new sector, wherein the new parent node takes place of the hash of the host node at the position to be inserted in the local Merkle tree associated with the host node.

5. The method of claim 1, wherein the request for data operation comprises performing a deletion operation on the sector stored at the host node, wherein performing the deletion operation comprises:
deleting the sector of the host node;
replacing the parent hash of the sector with a sibling hash of the sector to generate a new intermediate root; and
sending the parent hash along with authentication path and the new root as a proof of deletion is published on the Blockchain from where the client node verifies the deletion operation.

6. The method of claim 1, further comprising:
registering the plurality of host nodes on the blockchain using a host registration information, and registering the client node on the blockchain using a client registration information; and
storing, on the blockchain, the modified top root registration information and the client registration information to achieve fully stateless data operations.

7. A system, comprising:
one or more memories; and
one or more hardware processors, the one or more memories coupled to the one or more hardware processors, wherein the one or more hardware processors are configured to execute programmed instructions stored in the one or more memories, to:
provide a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes;
facilitate dynamic data operations on the file stored in the decentralized storage system, wherein facilitating the dynamic data operations on a sector from amongst the plurality of sectors stored at a host node from amongst the plurality of host nodes comprises:
receive, at the host node, a request for data operation on a sector stored at the host node;
send by the host node, the sector and authentication information associated with the sector to the client node, the authentication information comprising an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector;

compute, by the host node, a modified intermediate host root upon receiving the modified sector and the modified authenticator; and publish, by the host node, at the blockchain, the modified intermediate host root, wherein remaining hosts of the plurality of hosts recreates a modified top root using the modified intermediate host root, wherein, based on a determination of the modified top root and the modified intermediate host root, the client node confirms the data operation, and wherein, based on a determination of the modified top root and the modified intermediate host root, the client node confirms the data operation;

wherein the client node forms a local Merkle tree using modified vector and authentication path associated with the sector before modification, wherein the authentication path for each sector is represented by a set of intermediate sibling hashes required to compute a top root of the local Merkle tree, further wherein the local Merkle tree preserves the order in which the sectors are stored, and further wherein the local Merkle tree of modified sector corresponding to the host node and remaining intermediate roots of each of the plurality of host nodes form a global Merkle tree capable of validating a current status of the file, and wherein a root of each of the plurality of host nodes are taken as leaf nodes to form the global Merkle tree.

8. The system of claim 7, wherein the request for data operation comprises performing a modification operation on the sector stored at the host node, and performing an insertion operation on the sector stored at the host node, the insertion operation comprising inserting the new sector after a specific position of the host.

9. The system of claim 7, wherein the client node further sends an insert request to the host node along with the new sector, the position after which the sector is to be inserted, and the new authenticator.

10. The system of claim 7, wherein the one or more hardware processors are further configured by the instructions to create, by the host node, a new parent node from a hash of the sector at the position after which the sector is to be inserted and hash of the new sector, wherein the new parent node takes place of the hash of the host node at the position to be inserted in the local Merkle tree associated with the host node.

11. The system of claim 7, wherein the request for data operation comprises performing a deletion operation on the sector stored at the host node, and wherein to perform the deletion operation, the one or more hardware processors are further configured by the instructions to:

delete the sector of the host node;

replace the parent hash of the sector with a sibling hash of the sector to generate a new intermediate root; and send the parent hash along with authentication path and the new root as a proof of deletion is published on the Blockchain from where the client node verifies the deletion operation.

12. One or more non-transitory machine readable information storage mediums comprising one or more instructions which when executed by one or more hardware processors cause:

providing, via one or more hardware processors, a decentralized storage system comprising at least a client node, a plurality of host nodes communicatively coupled to the client node via a communication interface and a blockchain, wherein the client node comprises a file, further wherein the client node splits the file in a plurality of blocks and each block into a plurality of sectors, and distributes each of the plurality of sectors to a host node from amongst the plurality of host nodes;

facilitating, via the one or more hardware processors, dynamic data operations on the file stored in the decentralized storage system, wherein facilitating the dynamic data operations on a sector from amongst the plurality of sectors stored at a host node from amongst the plurality of host nodes comprises:

receiving, at the host node, a request for data operation on a sector stored at the host node;

sending, by the host node, the sector and authentication information associated with the sector to the client node, the authentication information comprising an authenticator and an authentication path associated with the sector, wherein the host node determines validity of the authenticator and correctness of the authentication path, and in response creates a modified authenticator for a modified sector obtained by the modification of the sector, and wherein the client node further recreates and shares with the host node, a modified root corresponding to the host node using the authentication path and the modified sector;

computing, by the host node, a modified intermediate host root upon receiving the modified sector and the modified authenticator; and publishing, by the host node, at the blockchain, the modified intermediate host root, wherein remaining hosts of the plurality of hosts recreates a modified top root using the modified intermediate host root, and wherein, based on a determination of the modified top root and the modified intermediate host root, the client node confirms the data operation;

wherein the client node forms a local Merkle tree using modified sector and authentication path associated with the sector before modification, wherein the authentication path for each sector is represented by a set of intermediate sibling hashes required to compute a top root of the local Merkle tree, further wherein the local Merkle tree preserves the order in which the sectors are stored, and further wherein the local Merkle tree of modified sector corresponding to the host node and remaining intermediate roots of each of the plurality of host nodes form a global Merkle tree capable of validating a current status of the file, wherein a root of each of the plurality of host nodes are taken as leaf nodes to form the global Merkle tree.

* * * * *